United States Patent [19] [11] Patent Number: 5,902,116
Rieber et al. [45] Date of Patent: May 11, 1999

[54] ELECTRONIC LEARNING APPARATUS WITH SELF-ADJUSTING LEVEL OF DIFFICULTY

[75] Inventors: Frederick M. Rieber, Rehoboth, Mass.; Joseph P. Seinowski, Cumberland; Randolph J. Primozic, Jr., Pawtucket, both of R.I.

[73] Assignee: Hasbro, Inc., Pawtucket, R.I.

[21] Appl. No.: 08/936,262

[22] Filed: Sep. 24, 1997

Related U.S. Application Data

[62] Division of application No. 08/473,830, Jun. 7, 1995, Pat. No. 5,681,170.

[51] Int. Cl.$^6$ ............................................. G09B 5/00
[52] U.S. Cl. ..................... 434/355; 434/308; 434/317; 434/319; 434/322
[58] Field of Search ..................... 434/308, 309, 434/317–322, 327, 335, 355

[56] References Cited

U.S. PATENT DOCUMENTS 5,484,292  1/1996  McTaggart ............................. 434/317
5,520,544  5/1996  Manico et al. ......................... 434/317
5,531,600  7/1996  Baer et al. ............................. 434/317

Primary Examiner—Glenn E. Richman

Attorney, Agent, or Firm—Kurt R. Benson

[57] ABSTRACT

A talking electronic learning aid is operative for requesting one or more responses from the operator, receiving responses from the operator and then automatically adjusting the level of difficulty of subsequent requests dependent upon the prior responses of the operator. The device consists of an electronic memory for storing a plurality of data sets, a speech synthesizer, a keyboard input device, and a micro-controller for controlling operation of the device. Each of the data sets includes speech data from which requests for operator response are derived, and further includes corresponding control data related to the appropriateness of operator responses to the requests. Each of the data sets preferably reflects a different level of intellectual difficulty. In operation, the micro-controller selects a first data set, and further randomly accesses a portion of the speech data of the selected data set from which a random request for an operator response is derived The random request is output to the operator via the speech synthesizer to which the operator then inputs a response. The micro-controller compares the operator response to the corresponding control data of the selected data set and communicates a message to the operator related to the appropriateness of the operator response. Depending on the appropriateness of one or more prior operator responses, the micro-controller is further operative for automatically selecting a new data set having a different level of intellectual difficulty from which subsequent requests for operator response may be derived.

18 Claims, 7 Drawing Sheets

ELECTRONIC LEARNING APPARATUS WITH SELF-ADJUSTING LEVEL OF DIFFICULTY

This is a divisional of application Ser. No. 08/473,830, filed Jun. 7, 1995, now U.S. Pat. No. 5,681,170.

BACKGROUND AND SUMMARY OF THE INVENTION

The instant invention relates to electronic learning aids, and more particularly to an electronic learning device which requests responses from the operator, and which then automatically adjust the level of difficulty of subsequent requests dependent upon the responses of the operator to earlier requests.

Electronic learning aids have heretofore been known in the art. In this regard, the U.S. Pat. No. to Breedlove et al 4,516,260 is believed to represent the closest prior art to the subject matter of the instant invention of which the applicant is aware. Breedlove discloses a talking electronic learning device comprising, in general, an electronic memory for storing digital data including digital speech data and digital control data from which a plurality of requests for operator response and appropriate operator responses to the requests may be derived, and further comprising a speech synthesizer for converting the digital speech data into audible human speech, a programmed micro-controller for randomly selecting a predetermined requests for operator response, an input device for receiving operator response to the predetermined request, and means for indicating the appropriateness of the operator response. In other words, the device is operative for randomly requesting a response from the operator, such as spelling a particular word, wherein the operator inputs a response on an input device, such as a keyboard. The Breedlove device is further operative for informing the operator of whether the response is correct or not. Such devices have been found to be highly useful in teaching children, and other persons, a variety of different subjects, including spelling, geography etc. However, one known shortcoming of the prior art devices is that the device typically includes subject matter having only a single level of intellectual difficulty. While a device having a single level of intellectual difficulty is highly effective in maintaining the attention span of a child possessing a corresponding level of intelligence, it has been found that such a device is not as effective in maintaining the attention span of children having higher or lower levels of intelligence. More specifically, it can be appreciated that a child with a lower level of intelligence would become easily frustrated by the difficulty of the questions or requests of a particular device, while a child having a higher level of intelligence would quickly become bored with the ease of the questions of the particular device.

The instant invention provides an improved electronic learning device which is operative for requesting one or more responses from the operator, receiving responses from the operator, and then automatically adjusting the level of difficulty of subsequent requests dependent upon the prior responses of the operator. The device thus operates to lower the level of difficulty of the requests when the operator responds inappropriately, and further to increase the level of difficulty when the operator responds appropriately. The device effectively focuses in on the corresponding intellectual level of the operator based on the responses to the requests, maintains the level of difficulty of the requests, and further raises or lowers the level of difficulty to further maintain the attention of the operator. The device consists of an electronic memory for storing a plurality of digital data sets, a digital speech synthesizer an electronic keypad input device, and a micro-controller for controlling operation of the device. Each of the data sets includes digital speech data from which requests for operator response are derived, and further includes corresponding digital control data related to the appropriateness of the operator responses to the requests. Each of the data sets preferably reflects a different level of intellectual difficulty. In operation, the micro-controller selects a first data set, and further randomly accesses a portion of the digital speech data of the selected data set from which a random request for an operator response is derived and output to the operator via the speech synthesizer. The operator may then input a response through the keypad. The micro-controller compares the operator response with the corresponding control data of the selected data set, and then communicates a predetermined message to the operator, which message is related to the appropriateness of the operator response. Depending on the appropriateness of one or more prior operator responses to requests from the selected data set, the micro-controller is further operative for automatically selecting a new data set having a different level of intellectual difficulty from which subsequent requests for operator response may be derived.

Accordingly, among the objects of the instant invention are the provision of a learning apparatus which requests a response from the operator, and then outputs a message to the operator related to the appropriateness of the operator's response, the provision of an electronic learning apparatus comprising a plurality of digital data sets including digital request data from which a plurality of requests for operator response may be derived, and further including corresponding digital control data related to the appropriateness of said operator responses and still further wherein at least a portion of the plurality of digital data sets reflect a different level of intellectual difficulty; and the provision of a learning apparatus which requests responses from the operator, receives operator responses and then automatically adjusts the level of difficulty of subsequent requests dependent upon one or more prior responses of the operator.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Referring now to the drawings, the learning apparatus of the instant invention is illustrated and generally indicated at 10 in FIGS. 1–6. As will hereinafter be more fully described, the instant device 10 is operative for requesting responses from the operator, receiving responses from the operator, and then automatically adjusting the level of difficulty of subsequent requests dependent upon the prior responses of the operator.

Figure 1:
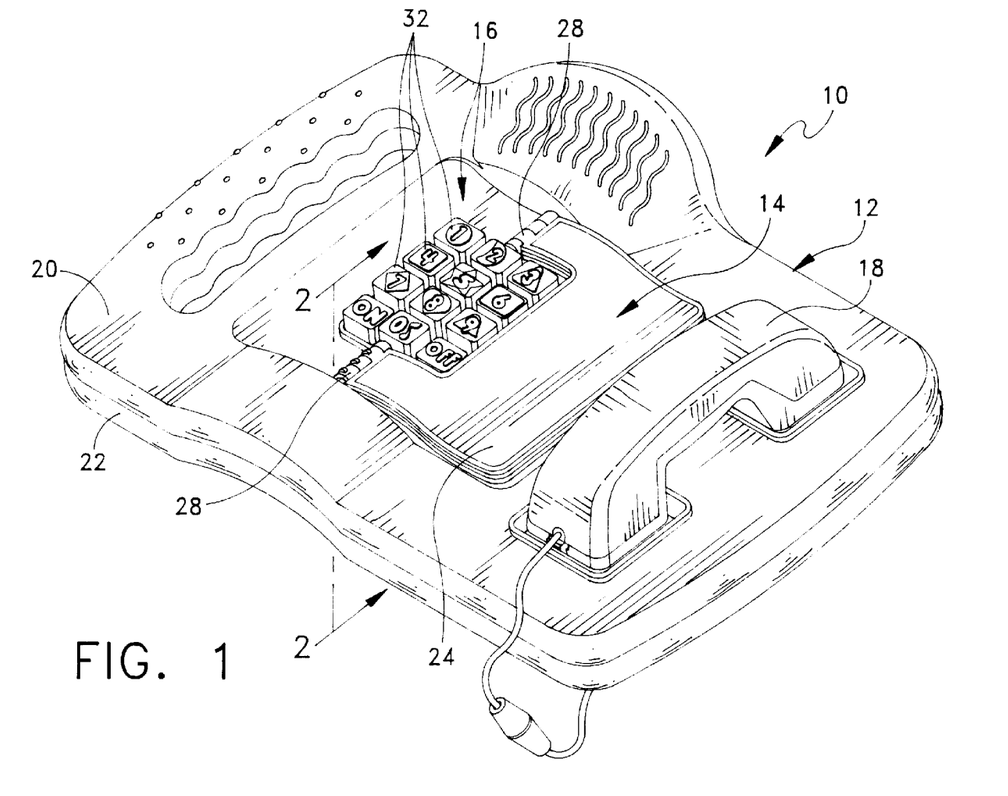
FIG. 1 is a perspective view of the learning device of the instant invention.
Figure 2:
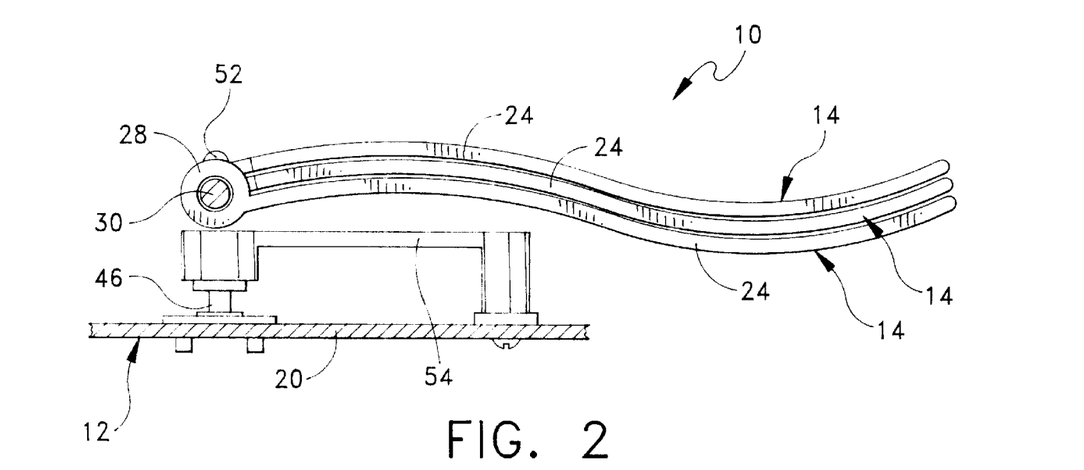
FIG. 2 is a cross-sectional view thereof taken along line 2—2 of FIG. 1.
Figure 3:
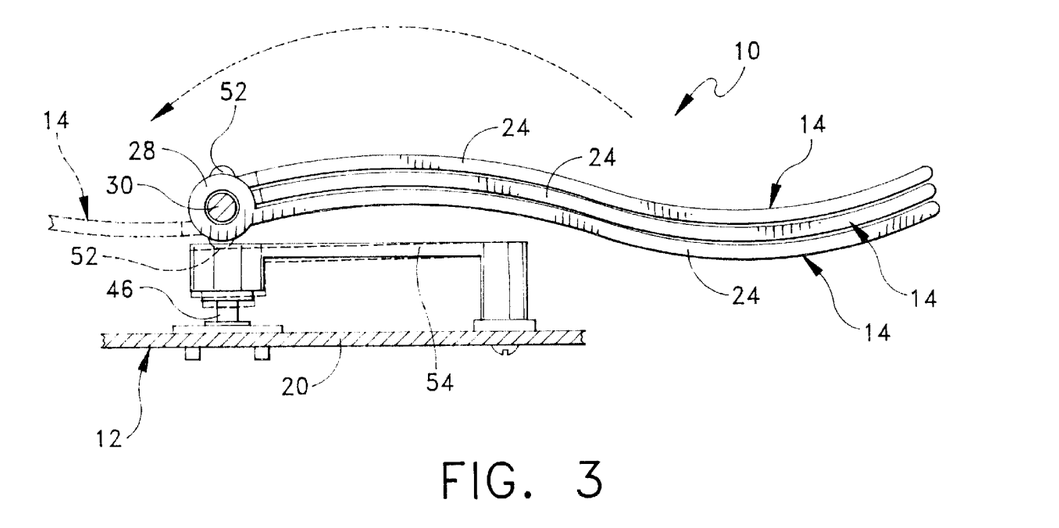
FIG. 3 is another view thereof showing one of the pages turned and the cam element of the page depressing a corresponding page trigger.
Figure 4:
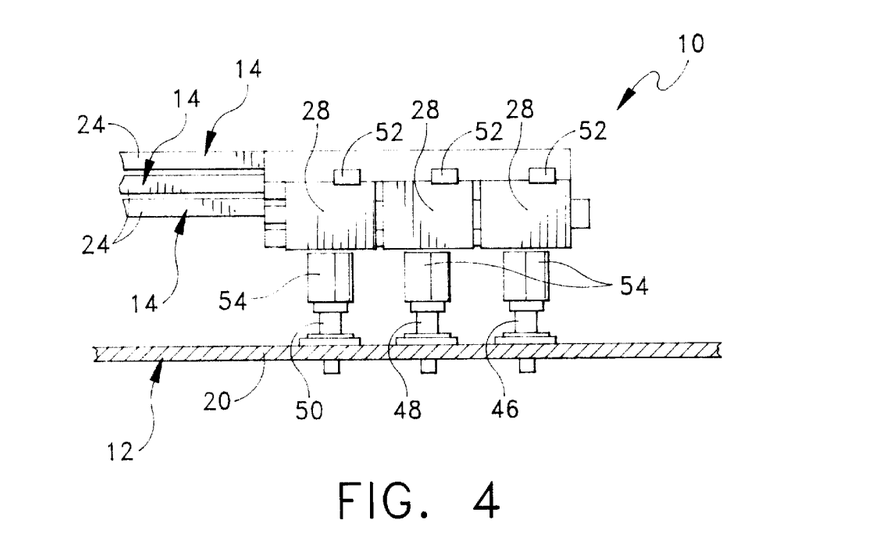
FIG. 4 is an and view of the cam and trigger assembly.
Figure 5:
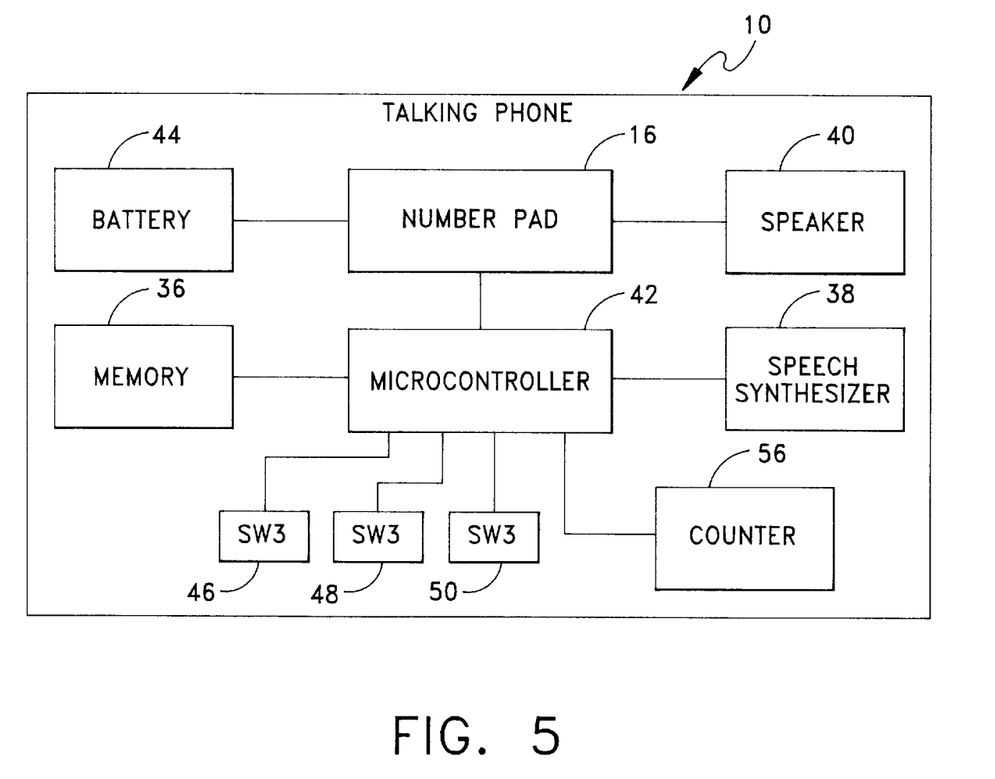
FIG. 5 is a schematic illustration of the device.
Figure 6:
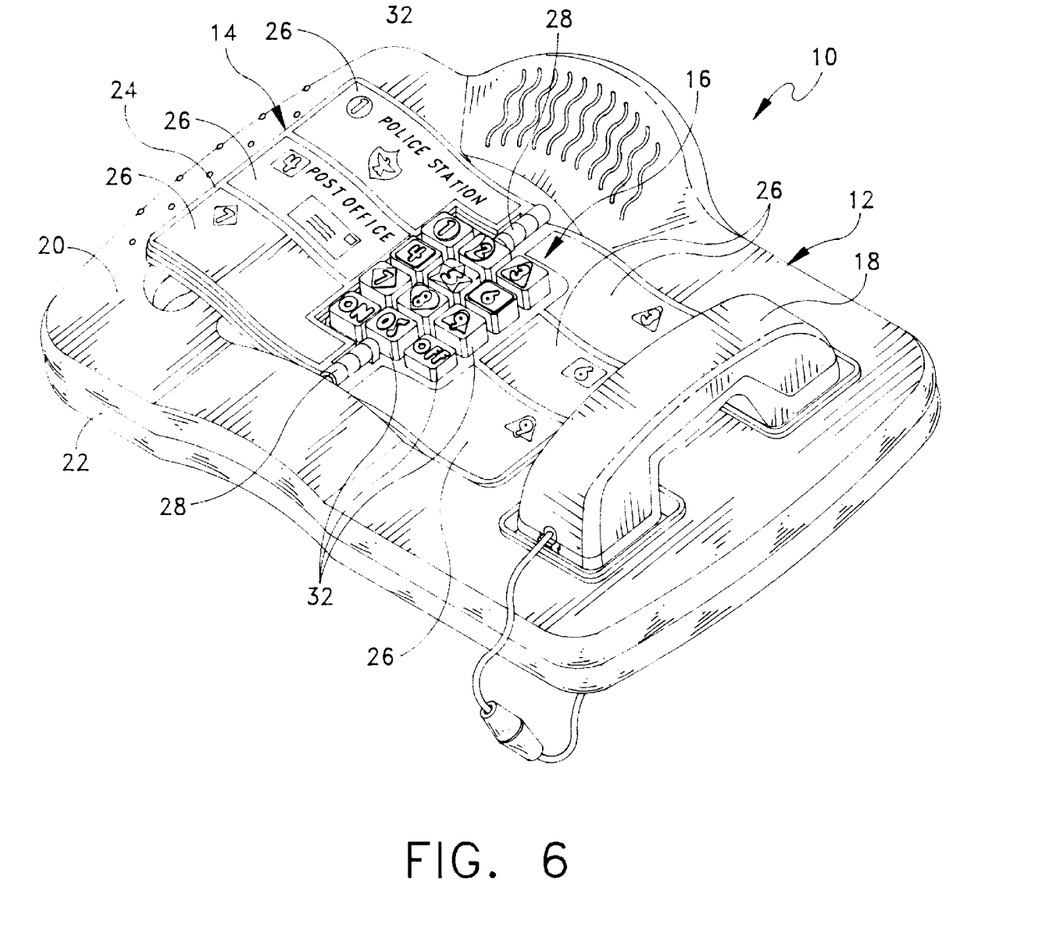
FIG. 6 is another perspective view thereof with book portion opened to a predetermined page.

The device 10 comprises a housing generally indicated at 12, a plurality of page members generally indicated at 14 hingeably mounted onto the housing 12, a numeric keypad generally indicated at 16, and a telephone handset 18 attached to the housing 12. The housing 12, keypad 16, and telephone handset 18 are preferably formed in the shape of a conventional telephone device to facilitate interaction between the operator and the device 10. The housing 12 is preferably constructed from upper and lower housing sections 20, 22 respectively which are received and secured together to define an interior cavity in which various electronic components of the device 10 are housed. Each of the page members 14 includes a planar page portion 24 upon which graphic illustrations 26 are depicted, and further include hinge barrel portions 28 which are received on a hinge pin 30 rotatably affixed to the housing 12. As illustrated in FIG. 6D the facing page members preferably include a plurality of individual illustrations 26 which include separately designated colors, numerals, shapes, selected quantities of certain objects, and other identifying characteristics, such as illustrated. For example, the upper left illustration comprises words "Police station", an illustration of a police officer and badge, the number one (1) and an orange circle, and further the illustration immediately below comprises words "Post Office", an illustration of a letter, the number four (4), and a brown square. It can be appreciated that the type and format of such illustrations 26 is limitless.

The electronic keypad 16 resembles that of a conventional telephone keypad. However, the indications on the faces of the keys 32 correspond to the various illustrations on the page members 14. For example, the numeric (1) key further includes a circle shape which is colored orange so as to correspond to the Police Station illustration on the page member. Similarly, the numeric (4) key includes a brown square so that it corresponds to the Post Office illustration. The remaining illustrations and numeric keys include other corresponding color and shape indicators. It is further pointed out that each set of facing page members 14 will include different illustrations. However, each illustration will nevertheless have corresponding identifying means to match the illustration with a numeric key 32 on the keypad 16. While the input device is specifically described as comprising a numeric keypad, it is to be understood that other types of input devices, such as alphanumeric keyboards, are also suitable for accomplishing the objectives of the invention.

Figure 7:
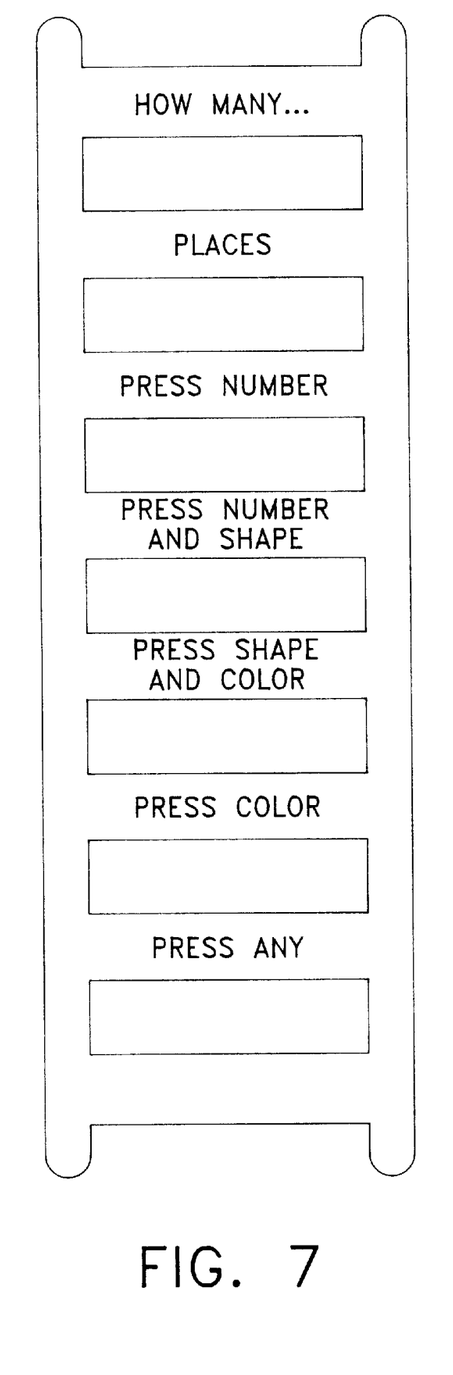
FIG. 7 is a graphical depiction of a 7-step learning ladder according to the instant invention.
Figure 8:
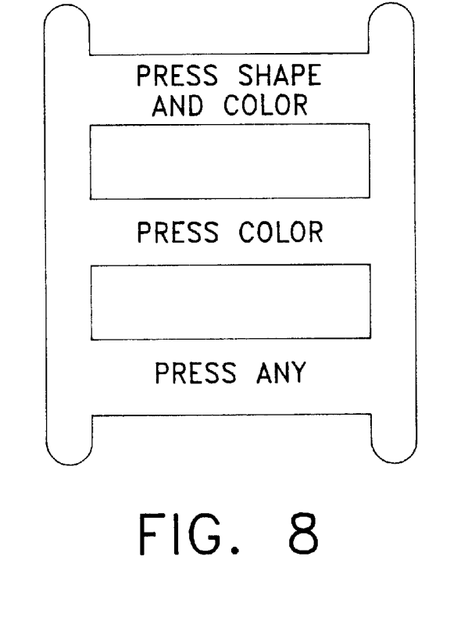
FIG. 8 is another graphical depiction of a 3-step learning ladder according to the instant invention.

With the above-identifying features in mind, the concept of the invention is to provide a device 10 which requests responses from the operator, receives responses from the operator through the numeric keypad 16, and then which varies the intellectual difficulty of subsequent requests dependent upon the prior responses of the operator. The device 10 first provides a plurality of data groups, each data group corresponding to the illustrations on a predetermined set of facing page members 14. For example, the preferred device 10 includes three separate sets of facing page members 14, thus the instant device 10 will provide three data groups, one group corresponding to each of the sets of facing page members 14. Within each data group, the data is divided into a plurality of data sets, each data sat preferably having a different level of intellectual difficulty. For example, the easiest level of difficulty might comprise a request to press any one of the number keys, i.e. "Press any button.", while the next level of difficulty comprises requests to press keys having different colors, i.e. "Please press the orange button." Still further, the next level of difficulty may comprise requests to press number keys having a particular shape and color, i.e. "Please press the brown square button." Referring to FIGS. 7 and 8, graphical depictions of the various contemplated "learning ladder" levels is illustrated. FIG. 7 illustrates a learning ladder having seven separate difficulty levels, while FIG. 8 illustrates a learning ladder having only three levels.

Each of the data sets, i.e. learning ladder levels, includes a plurality of requests for responses from the operator and further includes corresponding answer data related to the appropriateness of the operator's response. In operation, the device is operative for selecting a first data set, i.e. learning ladder level, from which to select requests for response. For example, in FIG. 7, arrow 34 points to a predetermined starting level wherein the operator is requested to press buttons having a particular number and shape combination. The device is further operative for randomly selecting a request for response from within the first data set and communicating the selected request for response to the operator. In this connection, the device may include any suitable communication device, including speech synthesizer devices, or liquid crystal displays, etc. For example, the first request might comprise "Please press the brown square button. " The operator would then input a response to the device by pressing one of the numeric keys, whereupon the device determines the appropriateness of the operator response with respect to the corresponding answer data provided. Depending on the operator response, the device produces output related to the appropriateness of the operator response. Furthermore, and most importantly with respect to the concept of the invention, the device is operative for automatically selecting another data set having a different degree of intellectual difficulty from which subsequent requests for operator response may be derived dependent upon the appropriateness of at least one prior operator response. In other words, if the operator responds appropriately to one or more requests, the device will select the next higher level of difficulty in order to challenge the operator. In the example illustrated in FIG. 7, the device would notch up to requests which related to numbers only rather than shapes and numbers. The next request would then comprise "Please press the number 2 button." As long as the operator continues to respond appropriately, the device will continue to select more difficult data sets. The next higher data set of FIG. 7 comprising requests to press buttons associated with places. For example a request from this data set might comprise, "Please call me at the Police Station. Press the right button." Such a request requires the operator to match the correct button with the illustration of the Police Station. Still further, the next higher level of difficulty would require the operator to count the number of objects in a particular illustration, and then press the corresponding numeric key. The device is further operative for decreasing the level of difficulty should the operator respond inappropriately. For example, if the operator did not appropriately respond to the requests in a particular level, the device would automatically notch down to the next lower levels and request a response. The device thus operates to lower the level of difficulty of the requests when the operator responds inappropriately, and further to increase the level of difficulty when the operator responds appropriately. Based on the operator responses, the device 10 effectively focuses in on the corresponding intellectual level of the operator, maintains the level of difficulty of the requests, and further raises or lowers the level of difficulty to further maintain the attention of the operator.

Referring now to FIGS. 2–5, the above concepts are preferably embodied in an electronic device 10 further comprising an electronic memory 36 for storing a plurality of digital data sets, an electronic speech synthesizer 38 and speaker 40 for communicating requests to the operator in audible human speech, and a micro-controller 42 for controlling operation of the device 10. The memory 36 comprises a conventional digital memory means capable of storing digital data. Each of the data sets includes digital speech data from which requests for operator response are derived, and further includes corresponding digital control data (answer data) related to the appropriateness of the operator responses to the requests. As stated previously, each of the data sets preferably reflects a different level of intellectual difficulty, although there may be, if desired, several data sets which have the same level of difficulty. The numeric pad 16, memory 36, speech synthesizer 38, and speaker 40 are operably associated with the micro-controller device 42 which is in turn electrically connected to a battery power source 44 for providing electrical power to the device 10. The micro-controller 42 is conventional in the art and is programmed according to conventional programming techniques to carry out the logic and methodology of the instant invention. In this connection, a representative flow chart illustrating a preferred dialog, logic and operator input format is set forth. Logic steps of the programming are illustrated in the oval boxes, operator input steps are illustrated in the pentagonal boxes, and dialog steps are illustrated in rectangular boxes.

As stated previously, the device is provided with a plurality of data groups each including a plurality of data sets. Each particular data group is accessed by electrical switches 46, 48, 50, respectively which are operably associated with the micro-controller 42. Closure of a particular switch 46, 48, 50 triggers the micro-controller 42 to select a particular data group which corresponds to the page members 14 which are facing the operator. The switches 46, 48, 50 preferably comprise elastanumeric switches which are activated by pressure applied thereto. Pressure is applied to the switches 46, 48, 50 by means of cam members 52 formed on the hinge barrels 28 of the page members 14. More specifically, the hinge barrel 28 of each page member 14 includes an enlarged cam surface 52 which, when the page member is hingeably pivoted, engages a corresponding resilient arm member 54 positioned above the particular switch. Turning of the page member 14, forces the arm member 54 downwardly (See FIG. 3), which in turn causes the switch to be depressed, triggering the micro-controller 42 to select the data group associated with that particular page member 14. As stated previously, the device 10 preferably includes three separate pages members 14, and thus the device 10 is provided with three separate switches 46, 48, 50 (See FIG. 4).

Figure 9A:
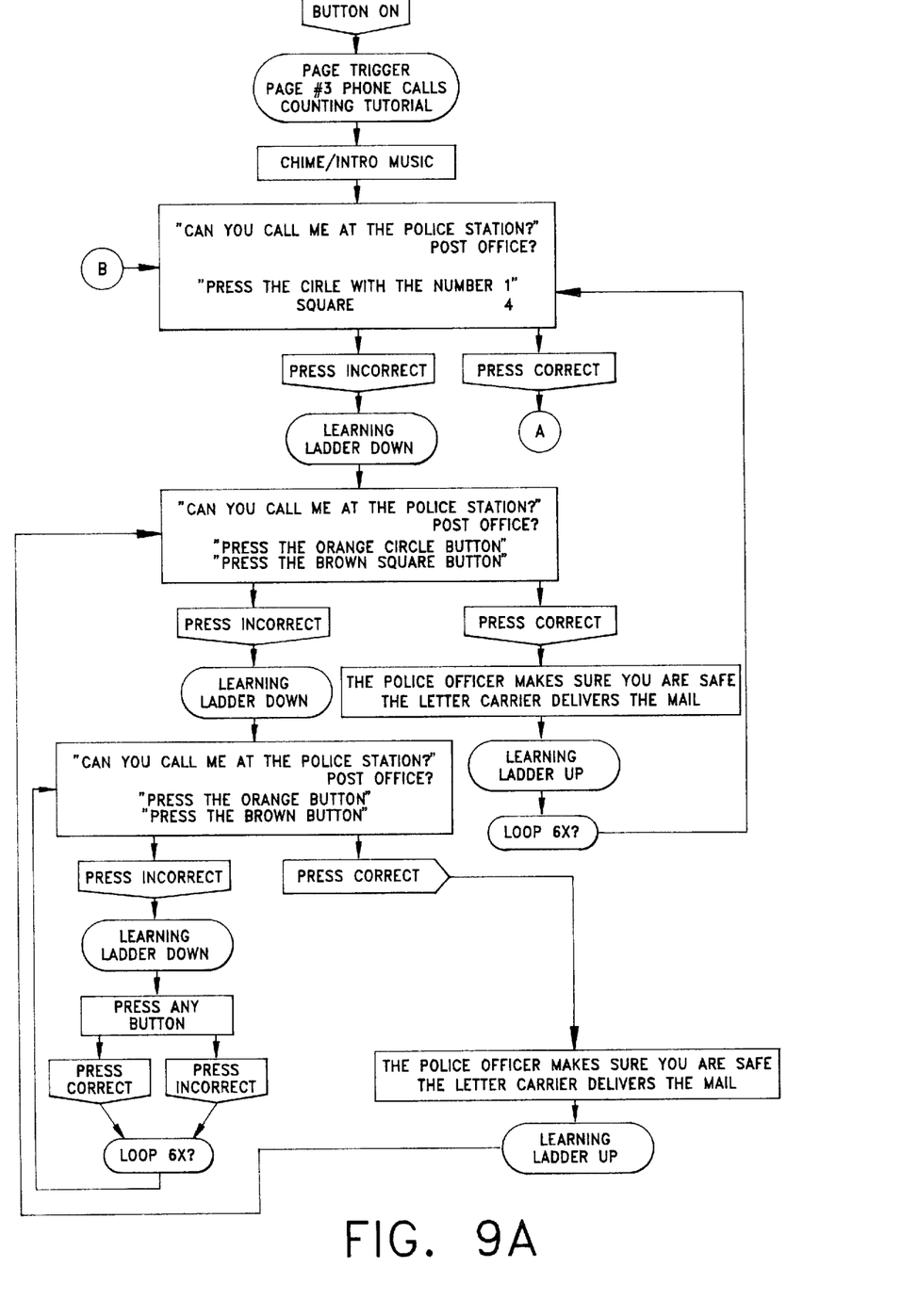
FIGS. 9A and 9B are flow charts showing the dialog, input and logic steps of the learning ladder programming.
Figure 9B:
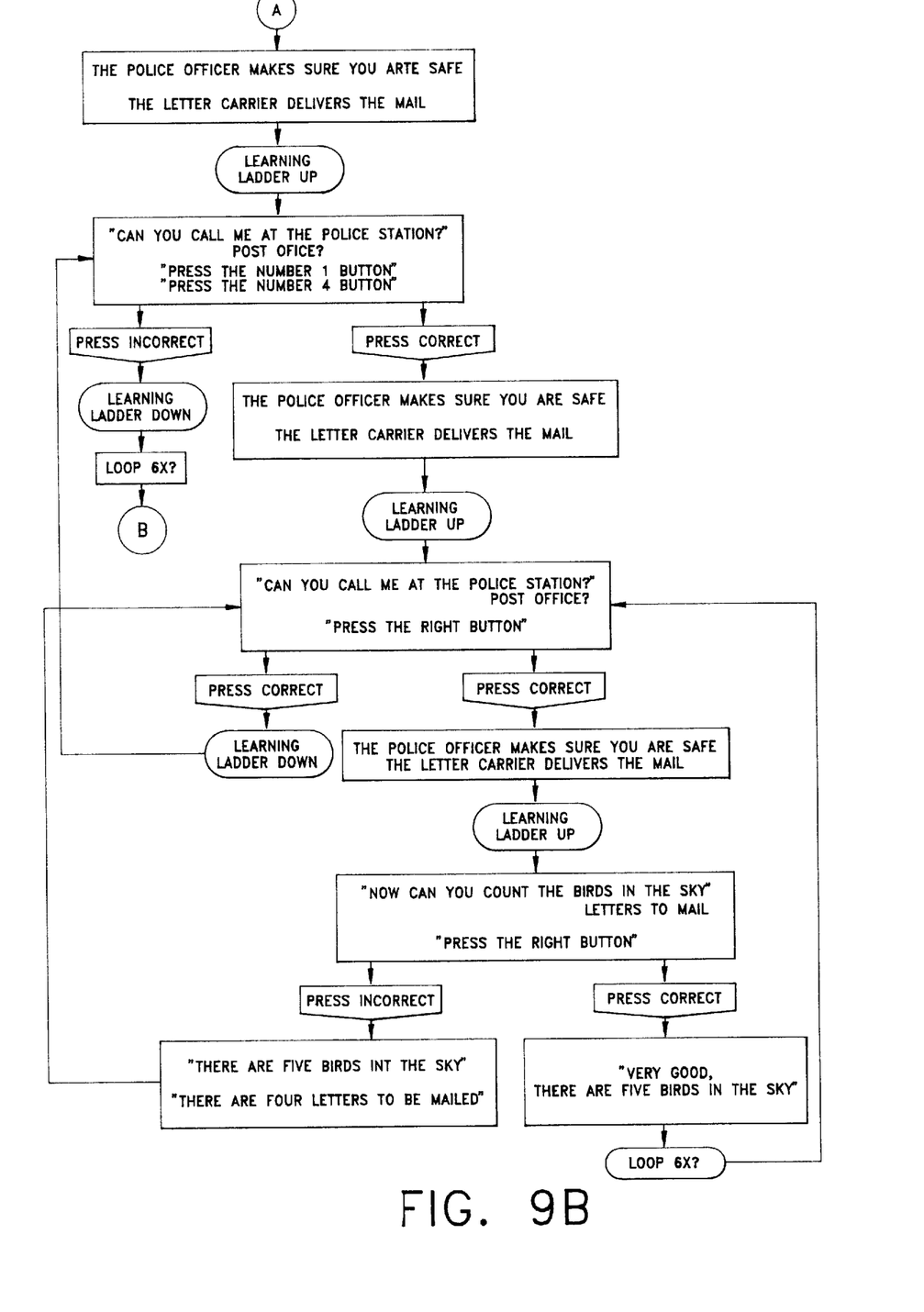

In operations the operator randomly selects a particular page to view. Turning of the page member 14 triggers the respective page switch, wherein the micro-controller 42 selects the corresponding data group. The micro-controller 42 then selects a first data set, i.e. learning ladder level, from within the data group, and further randomly accesses a portion of the digital speech data of the selected data set from which a random request for an operator response is derived and output to the operator via the speech synthesizer 38, and speaker 40. It is pointed out that selection of the first data set may be predetermined by programming, or may be randomly selected by the micro-controller 42 each time the device 10 is operated. In the instant embodiment, the device 10 is programmed to select a middle level of difficulty as a starting rung on the learning ladder (See FIG. 7). once the request is communicated to the operator, the operator may then input a response through the keypad 16. The micro-controller 42 compares the operator response with the corresponding control data of the selected data set and then communicates a predetermined message to the operator, which message is related to the appropriateness of the operator response. One or more requests for operator response may be requested from within the particular data set selected. Depending on the appropriateness of one or more of the prior operator responses to requests from the selected data set, the micro-controller 42 is further operative for automatically selecting a new data set having a different level of intellectual difficulty from which subsequent requests for operator response may be derived Through its programming, the device is thus able to focus in on the particular intellectual level of the operator. Referring to FIGS. 9A and 9B it can be seen from the flow chart that once a particular level of ability is established, the device will effectively toggle between the current level of ability and a higher level of ability. For example, when the operator responds correctly to a request, the device will notch up to the next level to challenge the operator to respond to a more difficult request. If the operator then does not respond appropriately to the more difficult request, it automatically notches back down to the previous level If the operator again responds appropriately, the device will notch back up to the next level to again challenge the operator.

The device 10 further includes a conventional digital bit counter 56 for determining the number of loops, i.e. request and response, which the device 10 has accomplished. Upon a predetermined number of loops, the device 10 may be programmed to prompt the operator to select a different page to further maintain operator interest.

It can therefore be seen that the instant invention provides an effective and novel learning device 10. The device 10 is provided with a plurality of digital data sets including request data from which a request for operator response may be derived, and corresponding answer data from which the appropriateness of the operator response may be determined. Each of the data sets preferably reflects subject matter or requests having a different intellectual level of difficulty. The device 10 selects a particular data set, i.e. level of difficulty, and then selects a particular request for response from the operator from within that data set. The device 10 receives responses from the operator, and then automatically adjusts the level of difficulty of the requests dependent upon the operator response by selecting a different data set having either a higher or lower level of difficulty. By responding to several requests, the operator enables the device 10 to focus in on the particular intellectual level of the operator to effectively maintain the operator's interest and to further challenge the operator in learning. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. A method of operating a learning device comprising the steps of:

provic a plurality of data sets, each data set including requests for responses from an operator and further including corresponding answer data related to the appropriateness of said operator responses, at least a portion of said plurality of data sets reflecting a different level of intellectual difficulty with respect to other data sets within said plurality of data sets;

selecting a first data set;

randomly selecting a request for response from said first data set;

communicating said selected request for response to said operator;

receiving an operator response from said operator through an input device;

determining the appropriateness of said operator response with respect to said corresponding answer data; producing output related to the appropriateness of the operator response; and selecting a second data set having a different degree of intellectual difficulty from which subsequent requests for operator response may be derived, said selection of sa id second data set being dependent upon the appropriateness of at least one prior operator response.

2. The method of claim 1 where in said requests for response are communicated to said operator with human speech.

3. The method of claim 1, wherein a second data set having a higher level of intellectual difficulty is selected if said at least one prior operator response is appropriate.

4. The method of claim 1, wherein a second data set having a lower level of intellectual difficulty is selected if said at least one prior operator response is inappropriate.

5. The method of claim 1, wherein a second data set having a higher level of intellectual difficulty is selected if said at least one prior operator response is appropriate, and further wherein a second data set having a lower level of intellectual difficulty is selected if said at least one prior operator response is inappropriate.

6. The method of claim 1, wherein said output related to the appropriateness of the operator response comprises audible output.

7. The method of claim 6, wherein said audible output related to the appropriateness of said operator response comprises audible human speech.

8. The method of claim 1 wherein said operator input is received through a keyboard.

9. The method of claim 1 wherein said first data set is randomly selected.

10. A method of operating an electronic learning aid comprising the steps of:

storing a plurality of digital data sets into an electronic memory means, each of said digital data sets including digital request data from which a plurality of requests for operator response may be derived, and further including corresponding digital control data related to the appropriateness of said operator responses, at least a portion of said plurality of digital data sets reflecting a different level of intellectual difficulty with respect to other digital data sets within said plurality of digital data sets;

selecting a first digital data set;

randomly accessing a portion of said digital request data of said first digital data set from which a request for an operator response may be derived;

outputting said randomly accessed portion of said digital request data in an output device to produce a randomly selected request;

receiving an operator response to said randomly selected request;

producing output related to the appropriateness of said operator response; and selecting a second digital data set having a different level of intellectual difficulty from which subsequent requests for operator response may be derived, said selection of said second data set being dependent upon the appropriateness of at least one prior operator response.

11. The method of claim 10 wherein said requests for response are communicated to said operator with human speech.

12. The method of claim 10 wherein a second digital data set having a higher level of intellectual difficulty is selected if said at least one prior operator response is appropriate.

13. The method of claim 10, wherein a second digital data set having a lower level of intellectual difficulty is selected if said at least one prior operator response is inappropriate.

14. The method of claim 10 wherein a second digital data set having a higher level of intellectual difficulty is selected if said at least one prior operator response is appropriate, and further wherein a second digital data set having a lower level of intellectual difficulty is selected if said at least one prior operator response is inappropriate.

15. The method of claim 10, wherein said output related to the appropriateness of the operator response comprises audible output.

16. The method of claim 15, wherein said audible output related to the appropriateness of said operator response comprises audible human speech.

17. The method of claim 10 wherein said operator input is received through a keyboard.

18. The method of claim 10, wherein said first digital data set is randomly selected.

* * * * *